US012420855B2

(12) United States Patent
Barritault et al.

(10) Patent No.: US 12,420,855 B2
(45) Date of Patent: Sep. 23, 2025

(54) MOTOR VEHICLE STEERING WHEEL WITH FOLDABLE OR RETRACTABLE RIM

(71) Applicant: Autoliv Development AB, Vargarda (SE)

(72) Inventors: Matthis Barritault, Chiré-en-Montreuil (FR); Sebastien Cassin, Louneuil (FR); Thomas Leboeuf, Chiré-en-Montreuil (FR)

(73) Assignee: Autoliv Development AB, Vårgårda (SE)

( * ) Notice: Subject to any disclaimer, the term of this patent is extended or adjusted under 35 U.S.C. 154(b) by 117 days.

(21) Appl. No.: 18/257,518

(22) PCT Filed: Dec. 14, 2021

(86) PCT No.: PCT/EP2021/085602
§ 371 (c)(1),
(2) Date: Jun. 14, 2023

(87) PCT Pub. No.: WO2022/128987
PCT Pub. Date: Jun. 23, 2022

(65) Prior Publication Data
US 2024/0034388 A1    Feb. 1, 2024

(30) Foreign Application Priority Data
Dec. 18, 2020   (FR) ..................................... 2013666

(51) Int. Cl.
| *B62D 1/04* | (2006.01) |
| *B62D 1/06* | (2006.01) |
| *B62D 1/10* | (2006.01) |

(52) U.S. Cl.
CPC ................... *B62D 1/06* (2013.01); *B62D 1/10* (2013.01)

(58) Field of Classification Search
CPC .... B62D 1/06; B62D 1/10; B62D 1/08; F16H 1/16; B60Y 2400/405; B60Y 2400/70; B60Y 2400/83
See application file for complete search history.

(56) References Cited

U.S. PATENT DOCUMENTS 10,562,558 B1    2/2020  Spahn et al.
10,710,627 B2 *  7/2020  Kreutz .................... B62D 1/10
(Continued)

FOREIGN PATENT DOCUMENTS

DE     102020202144 A1 *  8/2021
EP         0497063 A1 *  8/1992  ............. B60R 25/02
FR        3108884 A1 * 10/2021

OTHER PUBLICATIONS

Notice of Reasons for Refusal, Japanese Patent Application No. 2023-535794, Date of Drafting Jun. 13, 2024 (Year: 2024).*

*Primary Examiner* — Adam D Rogers
(74) *Attorney, Agent, or Firm* — Matthew D. Thayne; Thayne and Davis LLC (57) ABSTRACT

A vehicle steering wheel comprising a central portion, a rim which can pivot relative to the central portion between a driving position and at least one retracted position, an actuator pivoting the rim and a locking member that can move between a locking position of the rim in its driving position, and a disengaged position, characterized in that it comprises a mechanism for transmitting movement between the actuator and the rim and between the actuator and the locking member, and which successively drives the locking member towards its disengaged position, then pivots the rim.

13 Claims, 5 Drawing Sheets

(56) References Cited

U.S. PATENT DOCUMENTS

| | | | |
|---|---|---|---|
| 11,180,177 B1* | 11/2021 | Aktas | B62D 1/06 |
| 11,230,315 B2* | 1/2022 | Kastelic | B62D 1/08 |
| 11,919,561 B2* | 3/2024 | Leboeuf | B62D 1/10 |
| 2021/0016820 A1* | 1/2021 | Nozawa | B62D 1/04 |
| 2021/0316777 A1* | 10/2021 | Kwon | B62D 1/181 |
| 2023/0347967 A1* | 11/2023 | Roh | B62D 1/04 |
| 2024/0140517 A1* | 5/2024 | Barritault | B62D 1/08 |

\* cited by examiner

MOTOR VEHICLE STEERING WHEEL WITH FOLDABLE OR RETRACTABLE RIM

TECHNICAL FIELD OF THE INVENTION

The present invention generally relates to motor vehicle steering wheels.

More particularly, the invention relates to a steering wheel with an orientable or retractable rim.

STATE OF THE ART

In the prior art of vehicle steering wheels, a motorized folding steering wheel system is known, for example from document US-B1-10.562.558, comprising: a steering wheel having a rim forming a substantially continuous ring which is pivotably connected to a central structure which is configured to be mounted on a steering column, and including an electric motor which is configured to pivot the rim from a vertical position—corresponding to a state allowing the vehicle to be driven—to a substantially horizontal stowed or retracted position, allowing other usages or uses of the steering wheel and its rim. Additionally, the steering wheel system comprises one or more additional system(s) for locking the rim in its vertical driving position, each of which is presented in the form of a dedicated locking system. Such a design is in particular bulky, heavy and expensive.

One aim of the present invention is to address the disadvantages of the prior art mentioned above and in particular, first of all, to propose a motor vehicle steering wheel, at least part of the rim of which is pivotable and can be locked in driving position by a compact and economical assembly for pivoting and locking.

DISCLOSURE OF THE INVENTION

For this a first aspect of the invention therefore relates to a vehicle steering wheel comprising:
a central part;
a movable structure including at least one portion of a rim mounted pivotably relative to the central part between:
a driving position in which the vehicle can be steered by a driver;
and at least one retracted position;
an actuator for pivoting the movable structure between its driving position and its retracted position;
a locking member that is mounted movably between an engaged position for locking the movable structure in the driving position thereof, and a disengaged position allowing the movable structure to pivot,
characterized in that it comprises a mechanism for transmitting movement between, on the one hand, the actuator and the movable structure, and, on the other hand, between the actuator and the locking member. Thus, the same actuator makes it possible to act on the locking member to control its changes in position and to pivot the rim.

According to one implementation, from a locked state in the driving position of the movable structure, the transmission mechanism is arranged to successively drive the locking member towards its disengaged position, then the movable structure towards its retracted position.

According to one implementation, the transmission mechanism may include a drive member of the movable structure arranged in rotation with the movable structure with an angular clearance corresponding to a drive offset of the movable structure relative to the locking member.

According to one implementation, the steering wheel may comprise a hub joined in rotation with the movable structure.

According to one implementation,
the hub may comprise a complementary opening and
the drive member (a drive sprocket for example) may be coaxial to the hub and may comprise an off-centered catch pin arranged to cooperate with the complementary opening with angular clearance so as to drive the hub,
and the transmission mechanism may comprise a resilient member, such as a spring, arranged between the hub and the drive member to return the drive member to an angular rest position when the movable structure is in its locked state in the driving position.

According to one implementation, the locking member can cooperate with a complementary part of the hub to immobilize the movable structure angularly and without clearance in its driving position.

According to one implementation, the hub may be coaxial with a primary pivoting axis of the movable structure.

According to one implementation, the steering wheel may comprise a position stop, such as an abutment pin, fixed relative to the central portion and which can define the angular driving position of the movable structure via the hub.

According to one implementation, the locking member may be a locking rocker arranged to pivot about a locking axis parallel to a primary pivoting axis of the movable structure.

According to one implementation, the transmission mechanism may comprise a toothed input member arranged to be driven by the actuator, the toothed input member being arranged to indirectly drive the rotation of the movable structure towards its retracted position in an offset manner relative to the driving of the locking member. Thus, the functional sequence for unlocking and then pivoting the rim (or vice versa) can be ensured by only controlling the activation of the actuator.

According to one implementation, the drive member may be a drive sprocket of the movable structure arranged to mesh directly or indirectly with the toothed input member.

According to one implementation, the toothed input member may be a toothed gear arranged to be rotated in both directions by the actuator.

According to one implementation, the transmission mechanism may comprise a worm arranged on the actuator to:
form the toothed input member and drive the drive member, or
drive the toothed input member.

According to one implementation, the transmission mechanism may comprise a drive cam of the locking member, such as a cam profile, which is connected, preferably in direct or indirect rotation, with the actuator and which cooperates with a cam-follower element carried by the locking member.

According to one implementation, the cam may be connected to the drive member.

According to one implementation, the steering wheel may comprise a locking guide, and the locking member is arranged between the movable structure and the locking guide.

According to a first example implementation, the transmission mechanism may comprise a locking pinion which can be arranged to drive the locking member and to mesh directly with the toothed input member.

According to one implementation, the actuator may belong to a category comprising a rotary electric motor, a geared motor with a rotary electric motor, an electric cylinder with axial displacement, and an electromagnet with axial displacement.

According to one implementation, the steering wheel may comprise at least one first lateral module for driving and locking the movable structure which can comprise the actuator, the locking member, and the transmission mechanism.

According to one implementation, the steering wheel may comprise another actuator for pivoting the movable structure between its driving position and its retracted position.

Another aspect of the invention relates to a vehicle comprising a steering wheel according to the first aspect.

DESCRIPTION OF THE FIGURES

Other characteristics and advantages of the present invention will become more apparent upon reading the detailed description of several embodiments of the invention, which are provided by way of example but in no way limiting, and illustrated by the attached drawings, in which.

DETAILED DESCRIPTION OF THE EMBODIMENTS

First Embodiment

Figure 1:
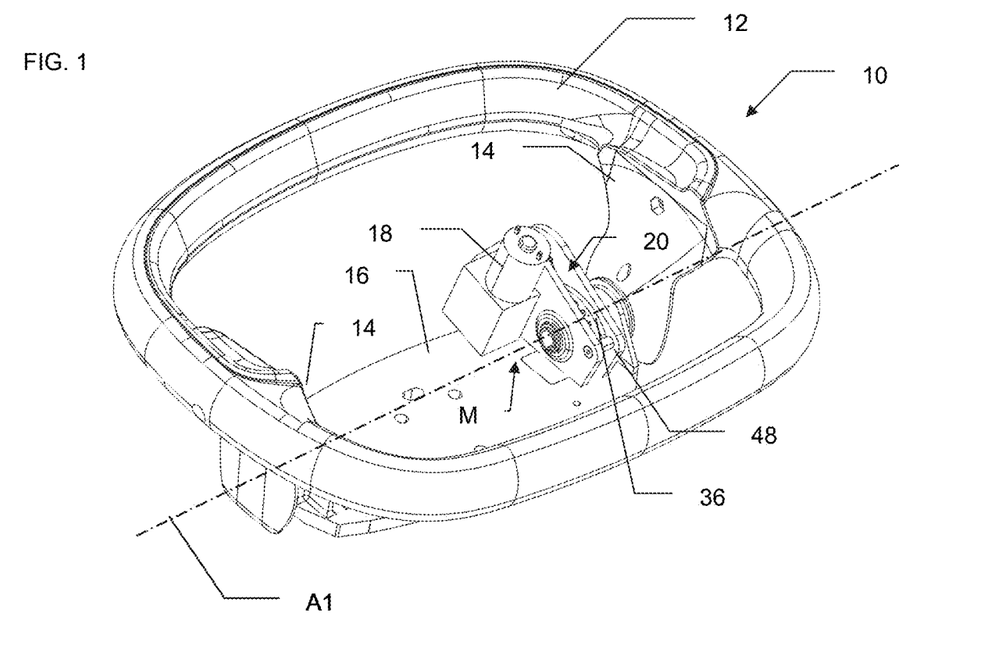
FIG. 1 is a perspective view of a first embodiment of a vehicle steering wheel which is shown in the driving position of the rim.
Figure 2:
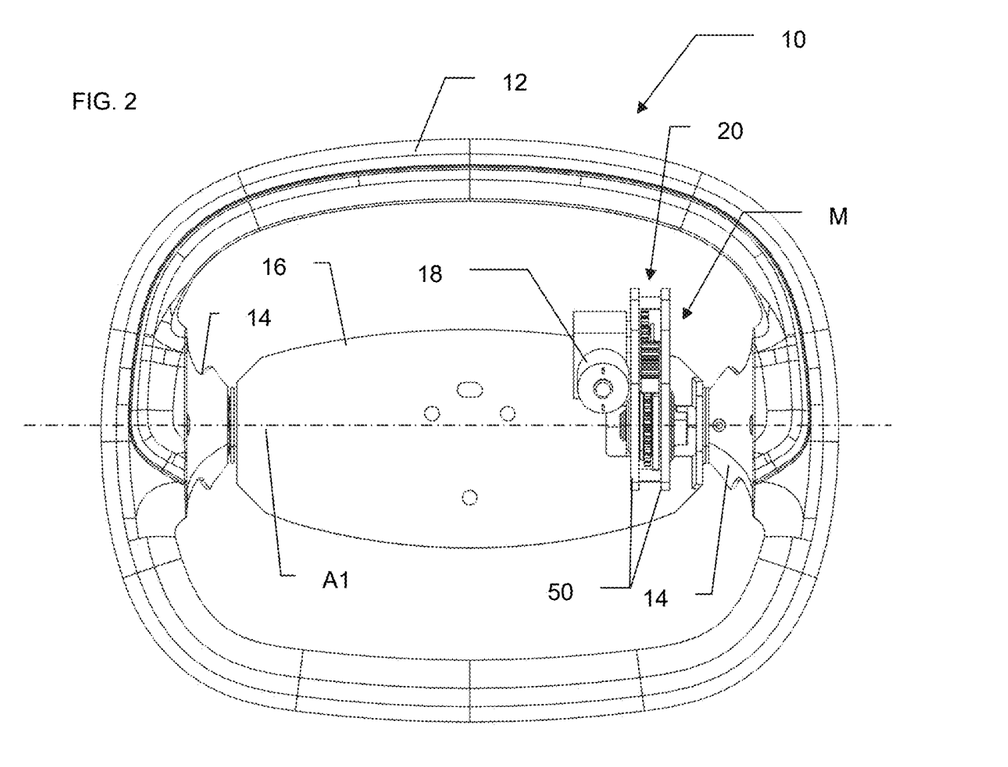
FIG. 2 is a top view of the steering wheel shown in FIG. 1.

FIGS. 1 and 2 show a steering wheel 10 comprising a rim 12 connected by arms 14 to a central portion 16, also referred to as a hub, which is arranged to allow the coupling of the steering wheel to a steering column of the vehicle or to an electric steering gear box (not shown).

In order to improve the ergonomics of usage and use of the vehicle, the rim 12 is at least partly mounted hinged relative to the central part 16, so as to be able to pivot in both directions about a primary axis A1 orthogonal to the axis of rotation of the steering wheel, in order to be positioned angularly:

either in a so-called driving position wherein the plane of the rim 12 is typically orthogonal to an axial direction of the central part 16 which coincides with the axis of rotation of the steering wheel and of the steering column during the driving of the vehicle;

or in a retracted position, also referred to as console position, wherein the plane of the rim 12 is thus tilted relative to the direction of the central part 16, especially so that a user can for example place a computer on the rim 12.

The possibility of changing the angular position is not necessarily limited to pivoting the entire rim 12, but can also relate to only a portion of the rim 12—for example only one half of the rim, such a rim portion constituting a movable structure of the rim in the sense of the invention.

By convention, the primary pivoting axis A1 of the rim 12 is oriented axially from rear to front.

By way of non-limiting example, in order to pivot the rim 12 in both directions, the steering wheel 10 includes herein a side module M for driving and locking the rim 12. The side module M is arranged herein adjacent to the rear arm 14 of the steering wheel 10.

The module M essentially combines a motorized actuator 18, a mechanism 20 for transmission between the actuator and the rim 12, and a member 22 for locking the rim 12 in its driving position.

Figure 3:
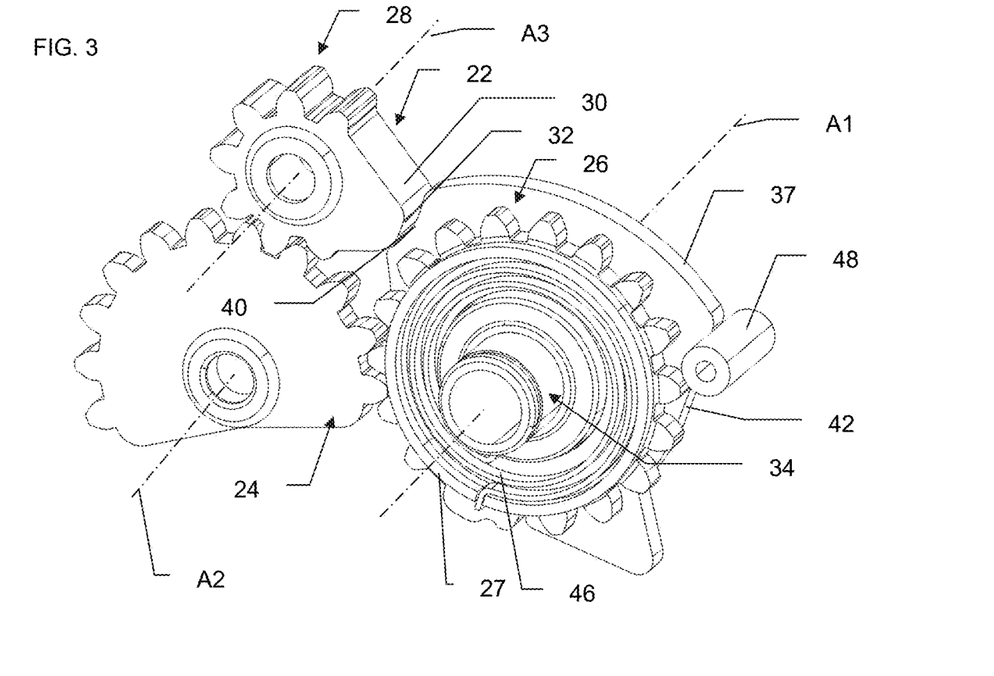
FIG. 3 is a large-scale perspective detail view which shows certain components of the movement-transmission mechanism which equips the steering wheel shown in FIGS. 1 and 2.

FIG. 3 shows:
a movement input gear 24 belonging to the transmission mechanism which is rotated about a secondary axis A2 by the actuator 18;
a gear 26 for pivoting the rim 12 which meshes permanently with the input gear 24 (by way of non-limiting example, the drive sprocket 26 is mounted rotatably about the primary pivoting axis A1 of the rim 12);
a locking rocker 22 comprising a proximal portion shaped as a locking pinion 28 which is mounted to rotate about a locking axis A3 and which permanently meshes with the input gear 24, and including a distal arm 30 which extends radially from the locking pinion 28 and whose free end section 32 is shaped into a convex locking surface, substantially in the form of an arc of a cylinder.

For the rotational connection in both directions between the drive sprocket 24 and the rim 12, FIG. 3 also shows a hub 34 that is capable of being rotatably secured to the rim 12 and which extends axially through the drive sprocket 26. At its rear, the hub is rotatably secured to a radial plate 36 of which the peripheral edge 37 has an opening, herein in the form of a notch 38, open radially outward, a concave locking surface 40, substantially in the form of an arc of a cylinder, and an abutment section 42.

In order to make it possible to pivot the hub 34 in an offset manner relative to the driving of the locking member 22, the rear radial face of the drive sprocket 26 has a catch pin 44, which extends axially toward the rear and which is permanently received in the notch 38 with an angular clearance "J" enabling a relative angular movement between the drive sprocket 26 and the hub 34. Furthermore, a spring 46, here made in the form of a spiral spring, is interposed between a rim 27 of the drive sprocket 26 which extends axially forward and the hub 34, and permanently ensures a resilient return of the drive sprocket 26 relative to the radial plate 36 of the hub 34 in the angular position shown in FIGS. 3, 4A and 4B, referred to as the rest position.

As can be seen in FIGS. 1 and 2, the module M herein has two parallel reinforcement plates 50 between which the input gears 24 and drive sprockets 26 are arranged, as well as the radial plate 36 of the hub 34 and the locking member 22, these various components also being mounted so as to rotate relative to these two reinforcement plates 50. In addition, the motorized actuator 18 is attached to the front reinforcement plate 50.

Additionally, a stationary axial abutment pin 48 is arranged between the two reinforcement plates 50 and is able to engage with the abutment section 42 facing the peripheral edge of the radial plate 36 of the hub 34.

Figure 4A:
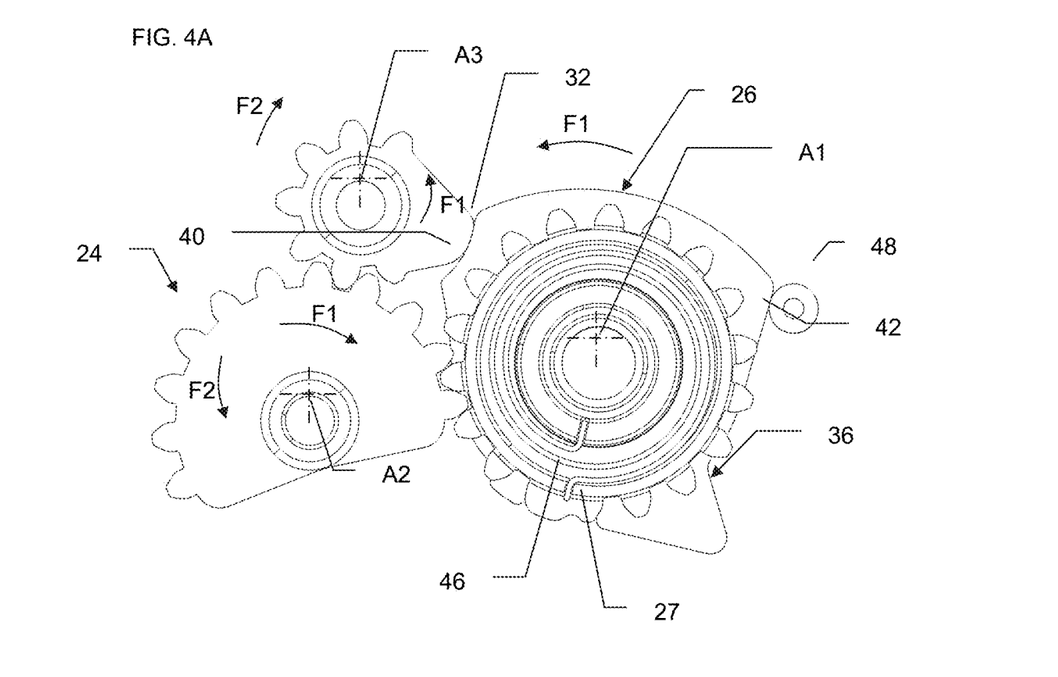
FIG. 4A is a front view of the components shown in FIG. 3.
Figure 4B:
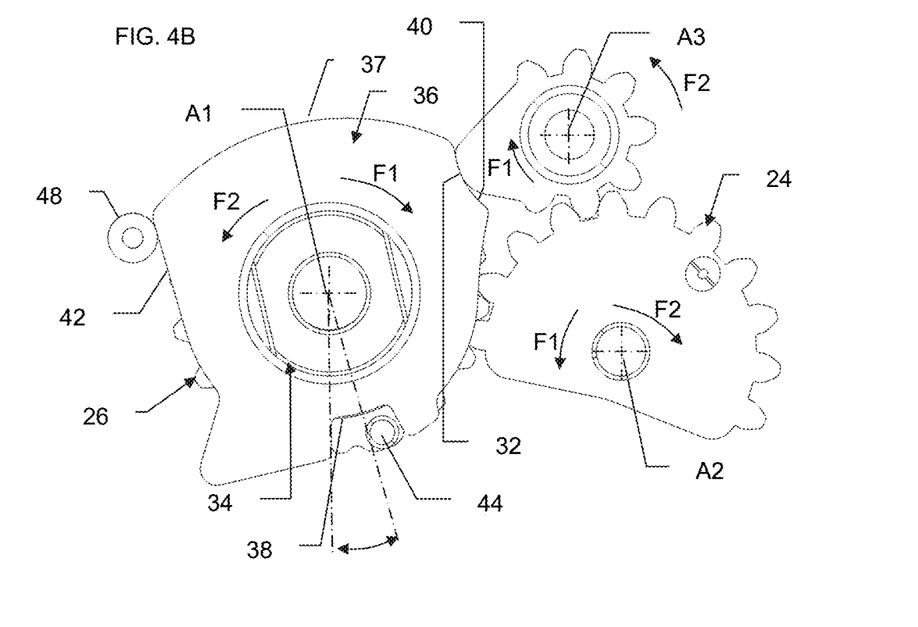
FIG. 4B is a rear view of the components shown in FIG. 3.

In FIGS. 3, 4A and 4B, the rim 12, and the set of associated components, is shown in its so-called angular driving position in which it is locked by the locking member 22.

The angular driving position of the rim 12, about its primary pivoting axis A1, is determined by the angular abutment of the abutment section 42 of the peripheral edge 37 of the radial plate 36 of the hub 34 in contact against the stationary axial abutment 48.

In this same position, locking is ensured by the complementary locking surfaces 32 and 40 which are braced against one another by a clamping effect thus ensuring locking without angular clearance of the rim 12 of the steering wheel, including after having moved into the clearances between the teeth of the different pinions.

Starting from the position shown in FIGS. 4A and 4B, to unlock the rim 12, and then pivot it toward a console position, it is necessary to drive the input gear 24 in the direction of the arrow F1 indicated in these figures.

The first part of the angular travel of the input gear 24 according to F1 immediately causes the rotation of the locking member according to the arrow F1 and this will cause the radial plate 36, and therefore the hub 34, to unlock or become released. During this first part of the angular travel of the input gear 24 according to F1, the input gear 24 drives the drive sprocket 26 and its axial catch pin 44 which then moves inside the notch 38, and does so against the resilient return force exerted by the spring 46.

As soon as the catch pin 44 has reached the other angular end of the notch 38, after compensating for the clearance "J", the first portion of the travel of the angular travel of the input gear 24 according to F1 is ended and its rotation continues, always according to the arrow F1, along a second part of its travel, then driving the radial plate 36 and thus the hub 34 and the rim 12.

Thus, the rim 12 is pivoted toward its console position, or retracted position, in an offset manner relative to the driving of the locking member 22 which is first pivoted by the input gear 24 in order to first ensure the unlocking of the rim 12.

Via the engagement of the axial catch pin 44 with the notch 38 of the radial plate 36 of the hub 34, the toothed input gear 24 meshes indirectly with the rim 12 in order to pivot it toward the retracted position thereof in an offset manner relative to the driving of the locking member 22.

Consecutively, starting from a console position and in order to return to the driving position, the input gear 24 is rotated in the direction of the arrow F2, the abutment section 42 of the peripheral edge 37 of the radial plate 36 of the hub 34 comes back into contact with the stationary axial abutment pin 48 and then the locking member 22 is only pivoted in the direction of the arrow F2, by virtue of the possibility of moving the catch pin 44 back into the notch 38.

Second Embodiment

Figure 5:
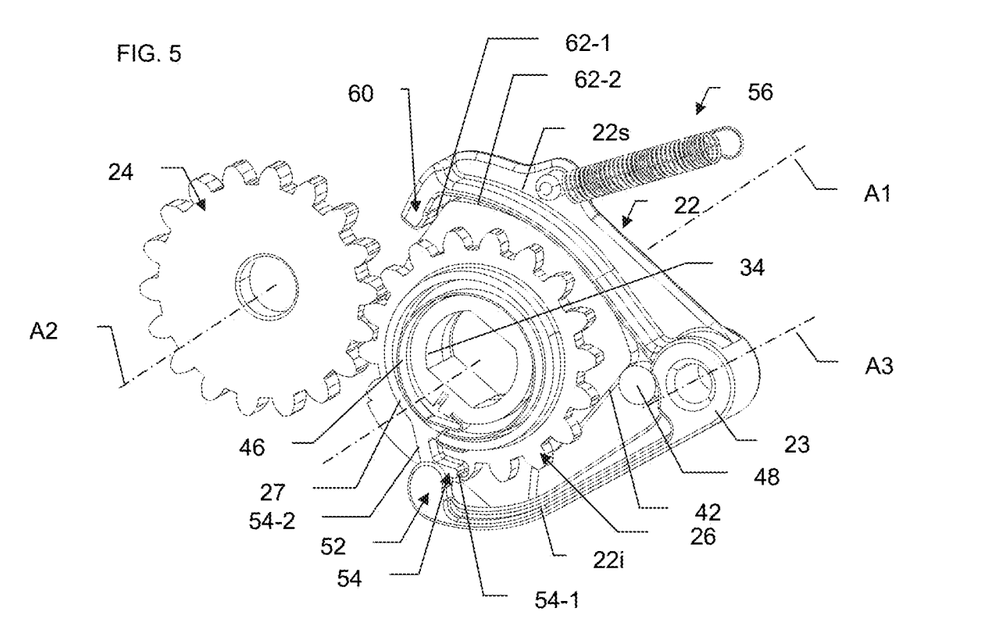
FIG. 5 is a view analogous to that of FIG. 3 which shows certain components of a second embodiment of the movement transmission mechanism which can equip the steering wheel shown in FIGS. 1 and 2.
Figure 6A:
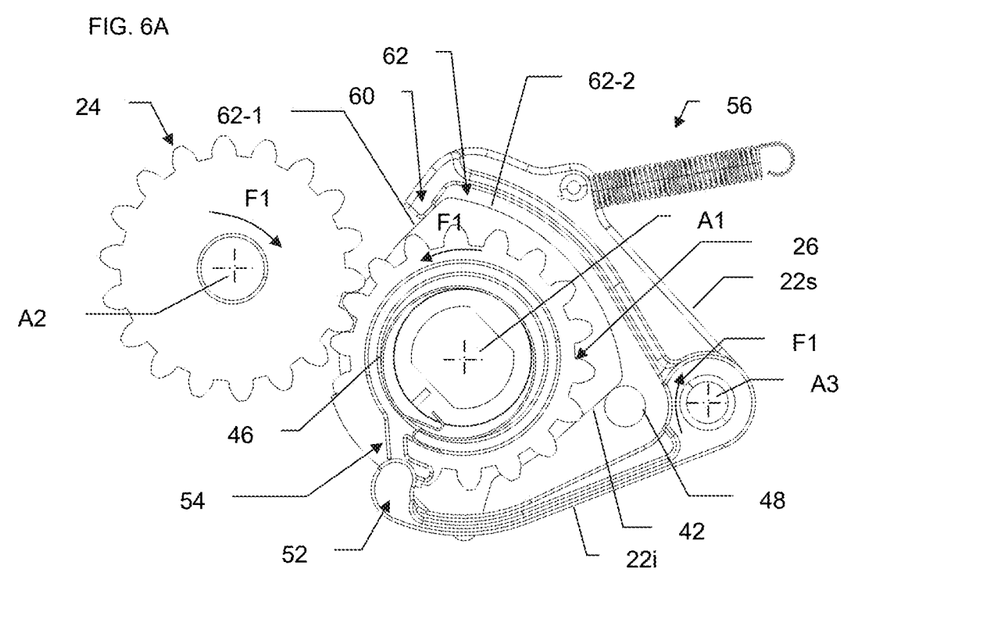
FIG. 6A is a front view of the components shown in FIG. 5.
Figure 6B:
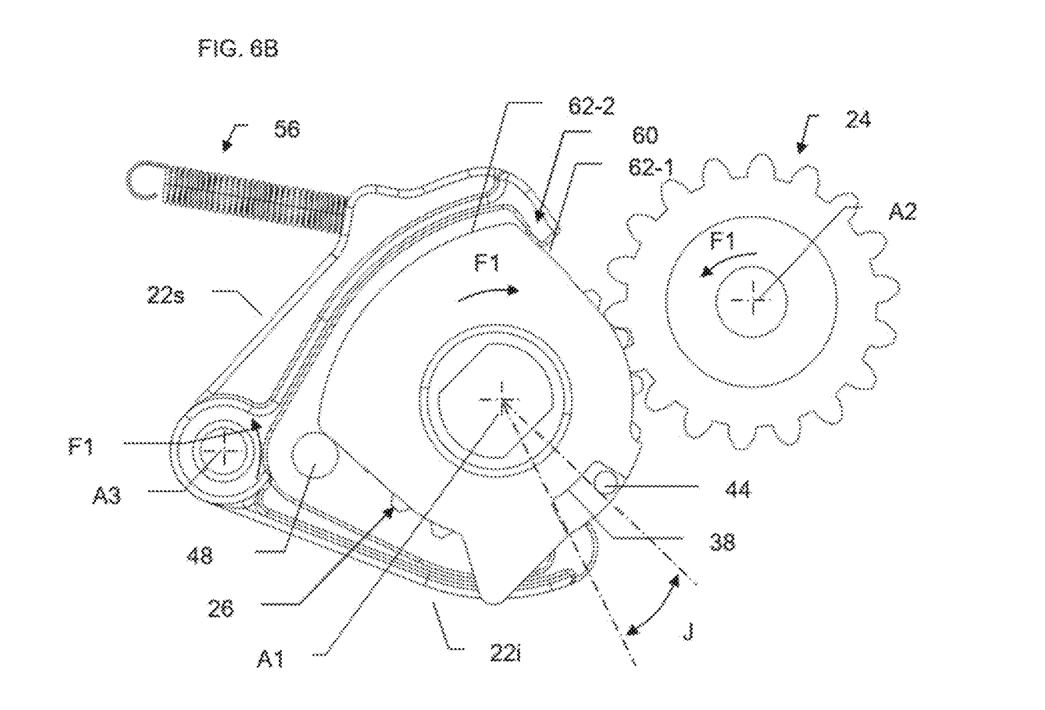
FIG. 6B is a rear view of the components shown in FIG. 5.

FIGS. 5, 6A and 6B, similar to FIGS. 3, 4A and 4B, show a second embodiment of some of the components of the transmission mechanism and of its locking rocker. It will be described in comparison with what has just been described with reference to FIGS. 3 to 4B and identical elements and components that are analogous or similar will be denoted by the same numerical or alphanumeric references.

More specifically, the locking rocker 22 shaped as a fork which comprises a central hub 23 that is mounted pivotably relative to the reinforcement plates 50 about a locking axis A3 parallel to the primary A1 and secondary axes A2 of the drive sprocket 26 and of the input gear 24, respectively.

From its central hub 23, the locking rocker 22 has two opposing radial arms including an arm 22i, a so-called control arm, which is lower in view of the figures, and an upper arm 22s, a so-called locking arm.

At its free end, the control arm 22i has a circumferential cam-follower element 52 which engages with an L-shaped cam profile section 54 which is supported and which is rotated by the rim 27 of the drive sprocket 26.

The cam-follower element 52 is permanently biased resiliently against the L-shaped cam profile 54 by a locking spring 56 that permanently biases the locking rocker 22 to rotate in the clockwise direction in view of FIGS. 5 and 6A.

At its free end, the locking arm 22s has a circumferential locking lip 60 which is able to engage with a locking section 62 of the peripheral edge 37 of the radial plate 36 of the hub 34 which, herein, is in two consecutive parts 62-1 and 62-2, substantially at right angles.

In the state of the rim 12 locked in driving position shown in FIGS. 5, 6A and 6B, the cam-follower element 52 bears against the radially outermost portion 54-1 of the cam profile 54 and the locking lip 60 engages with the part 62-1 of the locking section 62. In this state of the various components, it is impossible for the radial plate 36 and the hub 34 to rotate in the clockwise direction in view of FIGS. 5 and 6A (Arrow F1).

Starting from this position shown in FIGS. 6A and 6B, to unlock the rim 12, and then pivot it toward a console position, it is necessary to drive the input gear 24 in the direction of the arrow F1 indicated in these figures.

The first part of the angular travel of the input gear 24 according to F1 causes the immediate rotation of the drive sprocket 26 and of the cam profile 54. The cam-follower element 52 then leaves the radially outermost portion 54-1 of the cam profile 54 and descends along the tilted, radially innermost portion 54-2 of the cam profile 54. Under the action of the locking spring 56, this will cause the locking fork 22 to pivot in the direction of the arrow F1 and release the locking lip 60.

During this first part of the angular travel of the input gear 24 according to F1, the input gear 24 drives the drive sprocket 26 and its axial catch pin 44 which then moves inside the notch 38, and does so against the resilient return force exerted by the spring 46.

As soon as the catch pin 44 has reached the other angular end of the notch 38, after compensating for the clearance "J", the first portion of the travel of the angular travel of the input gear 24 according to F1 is ended and its rotation continues, always according to the arrow F1, along a second part of its travel, then driving the radial plate 36 and thus the hub 34 and the rim 12.

This rotation is possible because the locking lip 60 then bears on the part 62-2 forming a cylindrical arc of the locking section 62.

Thus, the rim 12 is pivoted toward its console position, or retracted position, in an offset manner relative to the driving of the locking member 22 which is first driven by the input gear 24 in order to first ensure the unlocking of the rim 12.

Via the engagement of the axial catch pin 44 with the notch 38 of the radial plate 36 of the hub 34, the toothed input gear 24 meshes indirectly with the rim 12 in order to pivot it toward the retracted position thereof in an offset manner relative to the driving of the locking member 22.

Regardless of the embodiment, within the meaning of the invention, the input gear 24 constitutes a toothed input member for the movement to be transmitted at least to the drive sprocket 26.

Alternatively, it is possible to replace the input gear 24 with a toothed inner crown gear or even with an optionally straight toothed rack.

The actuator 18 is for example a rotary electric motor which is optionally associated with a gearbox or with a gear reducer to form an electric gear motor. In this case, a rotating output shaft drives—directly or indirectly—the toothed input member such as the input gear 24.

Figure 6C:
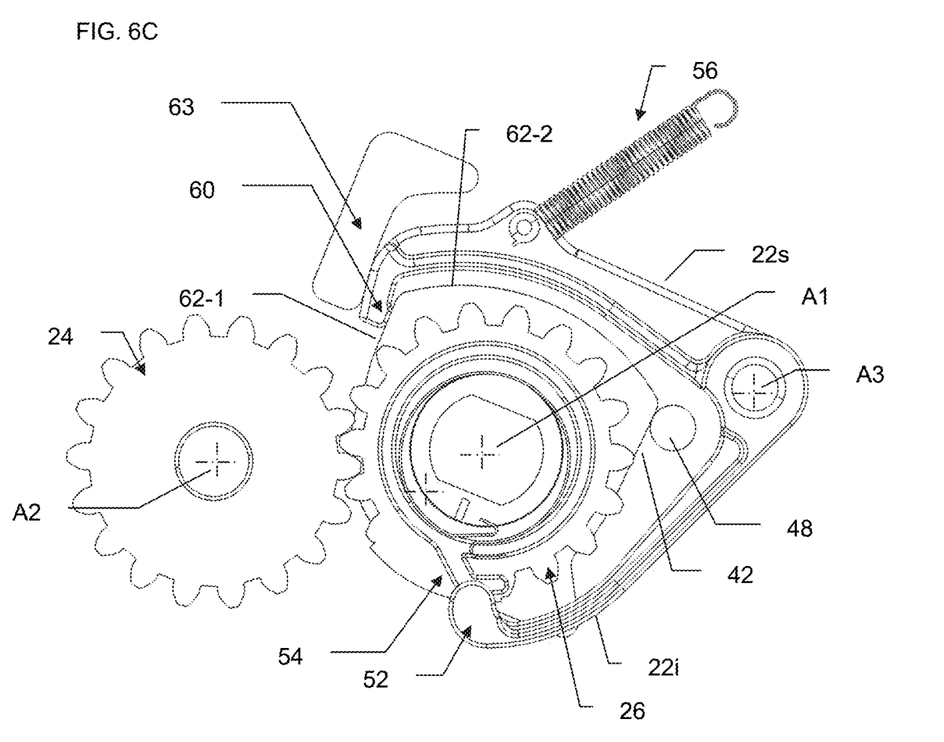
FIG. 6C is a variant of the mechanism of FIG. 6A.

FIG. 6C shows a variant of the mechanism shown in FIG. 6A or only the differences will be described. In FIG. 6C, a locking guide 63 is provided at the locking lip 60 of the locking fork 22. In particular, the locking lip 60 is arranged between the locking guide 63 and the locking section 62 of the peripheral edge 37 of the radial plate 36, so that in the locking position shown, the locking guide 63 pushes the locking lip 60 without clearance back against the locking section 62 to guarantee an absence of clearance when the rim 12 is in the driving position.

Alternatively, the output shaft can drive a screw of a worm-and-nut system in order to drive a toothed input member in both directions via member in the shape of a rack.

It will be understood that various modifications and/or improvements which are obvious to a person skilled in the art may be made to the different embodiments of the invention described in the present description without departing from the scope of the invention.

The invention claimed is:

1. A steering wheel for a vehicle comprising:
a central portion;
 a movable structure comprising at least one portion of a rim mounted pivotably relative to the central portion between:
a driving position in which the vehicle can be steered by a driver;
and at least one retracted position;
an actuator for pivoting the movable structure between the driving position and the at least one retracted position;
and a locking member that is mounted movably between an engaged position for locking the movable structure in the driving position thereof, and a disengaged position allowing the movable structure to pivot,
wherein the steering wheel comprises a transmission mechanism positioned between the actuator and the movable structure, and also positioned between the actuator and the locking member such that the actuator is configured to both pivot the movable structure and to move the locking member between the engaged position and the disengaged position.

2. The steering wheel according to claim 1, wherein, from a locked state in the driving position of the movable structure, the transmission mechanism is arranged to successively drive the locking member towards the disengaged position, then the movable structure towards the at least one retracted position.

3. The steering wheel according to claim 2, wherein the transmission mechanism includes a drive member of the movable structure arranged in rotation with the movable structure with an angular clearance (J) corresponding to a drive offset of the movable structure relative to the locking member.

4. The steering wheel according to claim 3, comprising a hub joined in rotation with the movable structure, and wherein:
the hub comprises an opening; and
the drive member is coaxial to the hub and comprises an off-centered catch pin arranged to cooperate with the opening with the angular clearance so as to drive the hub,
and in that the transmission mechanism comprises a resilient member arranged between the hub and the drive member to return the drive member to an angular rest position when the movable structure is in the locked state in the driving position.

5. The steering wheel according to claim 4, wherein the locking member cooperates with a part of the hub to immobilize the movable structure angularly and without clearance in its driving position.

6. The steering wheel according to claim 4, wherein the steering wheel further comprises a position stop fixed relative to the central portion and which defines the angular driving position of the movable structure via the hub.

7. The steering wheel according to claim 1, wherein the locking member is a locking rocker arranged to pivot about a locking axis parallel to a primary pivoting axis of the movable structure.

8. The steering wheel according to claim 1, wherein the transmission mechanism includes a toothed input member arranged to be driven by the actuator, the toothed input member being arranged to directly or indirectly drive the rotation of the movable structure towards the at least one retracted position in an offset manner relative to the driving of the locking member.

9. The steering wheel according to claim 8, wherein the transmission mechanism includes a drive member of the movable structure arranged in rotation with the movable structure with an angular clearance corresponding to a drive offset of the movable structure relative to the locking member, wherein the drive member is a drive sprocket of the movable structure arranged to mesh directly or indirectly with the toothed input member.

10. The steering wheel according to claim 8, wherein the transmission mechanism includes a locking pinion arranged to drive the locking member and to mesh directly with the toothed input member.

11. The steering wheel according to claim 1, wherein the transmission mechanism includes a drive cam for driving the locking member which is connected with the actuator and which cooperates with a cam-follower element carried by the locking member.

12. The steering wheel according to claim 11, wherein the steering wheel further comprises a locking guide, and wherein the locking member is arranged between the movable structure and the locking guide.

13. The steering wheel according to claim 1, wherein the actuator comprises a rotary electric motor, a geared motor with a rotary electric motor, an electric cylinder with axial displacement, or an electromagnet with axial displacement.

* * * * *